W. WAIT, Jr.
RANGE FINDER FOR USE UPON AERIAL VEHICLES OR MACHINES.
APPLICATION FILED APR. 24, 1916.

1,238,967.

Patented Sept. 4, 1917.

WITNESSES:

INVENTOR

BY

ATTORNEY

UNITED STATES PATENT OFFICE.

WILLIAM WAIT, JR., OF PEEKSKILL, NEW YORK.

RANGE FINDER FOR USE UPON AERIAL VEHICLES OR MACHINES.

1,238,967.  Specification of Letters Patent.  Patented Sept. 4, 1917.

Application filed April 24, 1916. Serial No. 93,104.

*To all whom it may concern:*

Be it known that I, WILLIAM WAIT, Jr., a citizen of the United States, residing at Peekskill, in the county of Westchester and State of New York, have invented an Improvement in Range-Finders for Use upon Aerial Vehicles or Machines, of which the following is a specification.

This invention relates to sighting devices upon aerial machines for determining the moment for ejecting a projectile or missile from the machine, and its object is to provide means combined with an observation tube, which may be a telescope, for automatically providing for sudden changes in the velocity or altitude of the machine when a missile is about to be dropped. The object is attained by the means set forth in this specification and the accompanying drawings, in which—

Figure 1:
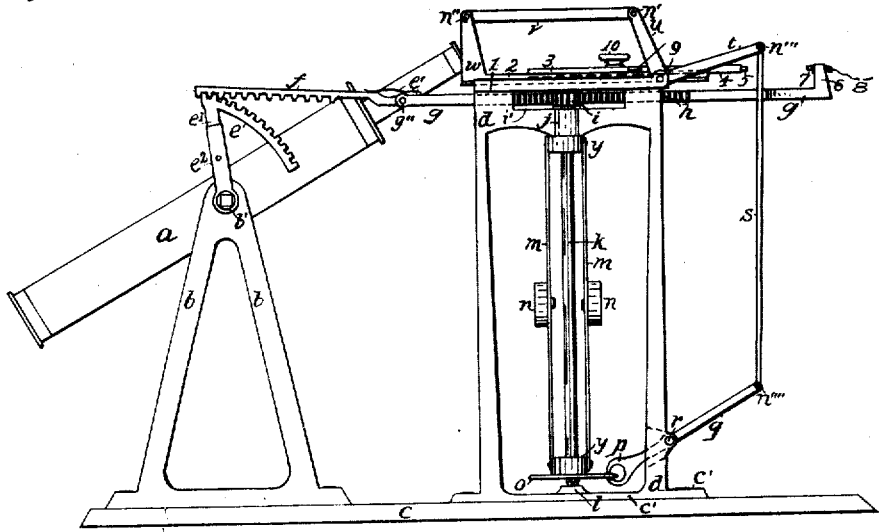
Figure 2:
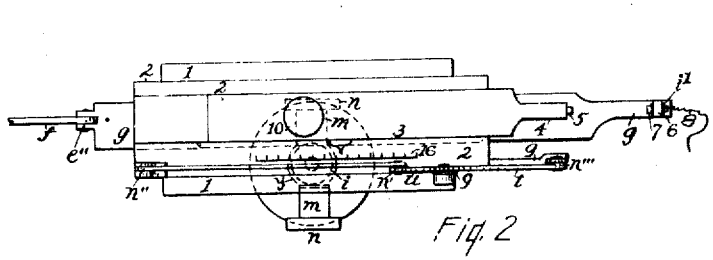
Figure 4:
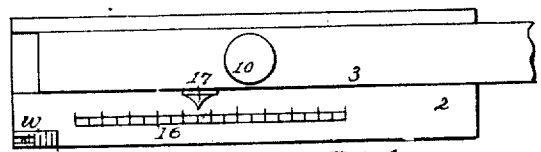
Figure 3:
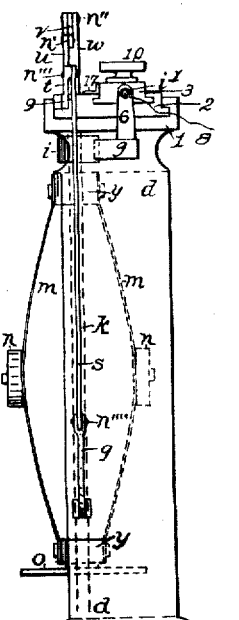
Figure 5:
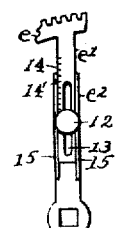

Figure 1 shows in elevation a telescope in combination with the device constituting this invention. Fig. 2 is a plan of the top of the device. Fig. 3 is an elevation of the device viewed from the right hand end. Fig. 4 is a representation of an adjusting scale. Fig. 5 is a detail relating to a toothed sector.

The telescope or whatever form of sighting device is employed, is supported upon standard $b$, $b$, swinging upon trunnions $b'$. A toothed sector $e$ is attached to one of the trunnions, and a rack $f$ engaging with the sector places the instrument under the control of the movements of the telescope.

This instrument is to be used in connection with electrical means for releasing a missile; but this application for patent embraces no more of the electrical devices than the contacting points that in closing actuate the electrical devices. The instrument is constructed upon a frame comprising standards $d$, $d$, the frame being rigidly connected with the frame that supports the range finder by a base as at $c$.

Upon the top of the standards $d$ is a base 1, Figs. 1 2 3, that is channeled to receive a sliding base 2. A channel in the base 2 admits a bar 3 which is reduced in size at its extreme end 4, and is provided at its extremity with a contact point 5. The bar 3 slides freely in its place, and is adjustable longitudinally, a thumb screw 10 being employed to fit the slide in position. Upon one side of the slide is a pointer 17 which traverses a scale 16 on the base 2.

Upon the inner end of the base 2 is an elevated bracket $w$. Upon the opposite end of the base 1 a crank-lever $u$ $t$ is pivoted, and the arm $u$ is connected with the bracket $w$ by a bar $v$, so that moving the bell-crank imparts a reciprocating motion to the sliding base 2. Near the foot of one of the standards $d$ a lever $p$ $q$ is pivoted at $r$. The outer end $g$ of the lever is connected with the arm $t$ of the aforesaid bell-crank by a rod $s$ by means of pivoted connections $n'''$ and $n''''$. The end $p$ of the lower lever is bifurcated at its end to engage with the rim of the disk $o$. The disk $o$ is slidable upon a vertical shaft $k$ which has bearings at $l$, Fig. 1, at its lower end, and at $j$ at its upper end. A collar $y$ is fast on the upper end of the shaft, and a collar $y'$ at the lower end of the shaft is fast to or integral with the disk $o$. The two collars are united by flat springs $m$ $m$, having weights $n$ $n$ fast to them midway between the collars, constituting a common form of spring centrifugal governor. In Fig. 3 the springs are shown as slightly expanded and lifting the disk $o$.

At the top of the standards beneath the base 1 is a recess at $i'$, see Fig. 1, and the body at each end is pierced to receive a bar $g$ $g$. The middle part of the bar is a toothed rack as at $h$. Upon the upper end of the shaft $k$ is a pinion $i$ that engages with the rack. Obviously, quickly moving the rack will cause action of the governor just described, and the raising and lowering of the disk $o$ will cause a movement of the base 2. The outer end of the bar $g$ $g$ terminates in a bracket 6 that is provided with an electrical contact point 7 which is in alinement with the contact point 5. Under normal conditions the bar 4 that carries the point 5 may be set so that in action the point 7 will be drawn forward to contact with the point 5 in a given time. If conditions change and cause an increase in the velocity of the point 7 the governor will be set in action and the point 5 will be pushed backward, accelerating the time in the meeting of the points.

The bar $g$ $g$ at its forward end is provided with a hinged rack $f$, swinging upon a pivot $g''$. Upon one of the trunnions $b'$ of the range finder an arm $c^2$ $c^1$ carries a parabolical segment $e$ and with its toothed surface the rack *f* engages; and through this sector and rack the instrument described becomes controllable by the movements of the range finder. A spring *e'* serves to maintain the contact of the toothed surfaces.

The arm of the sector is shown in enlarged detail in Fig. 5 from the side that would be toward the operator. The part *e¹* is made slidable upon the part *e²*. Side flanges upon the part *e²* at 15 steady the part *e¹*, and a thumb nut 12 in the main arm and a slot as 13 in the sliding arm renders the arm adjustable as to length. A scale 14 and a fixed point 14' adapts the arm for suitable calibration for adjustments of the length of the arm.

In Fig. 4, upon an enlarged scale, is shown the sliding table 2 and a portion of the sliding arm 3, with a pointer 17 on the bar 3 and a scale 16 upon the base 2, the scale adapted to be calibrated for altitudes or rather for velocities for given altitudes, the altitudes to be obtained with an aneroid barometer.

The operation of the device is as follows: The altitude being determined by the barometer the bar 3 and the sector *e* will be set in accordance with their respective scales. These adjustments being made the operator sights the object aimed at through the range finder, and follows the object with it as the machine approaches the vertical over the object, the missile being dropped, of course, before the vertical is attained. In approaching the object the arc of movement of the range finder imparts movement to the sliding bar *g*. This movement would eventually bring the contact points 5 and 7 together, and if the altitude and the speed of the machine remained constant, the adjustments of the scales would at the proper moment drop the missile without operating the governor.

But altitudes and velocities vary, and the speed of the machine is liable to vary under varying atmospheric conditions, hence the means shown for automatically determining and allowing for these varying factors. Movement of the range finder through the rack on the sliding bar rotates the governor when moved quickly, and the governor in turn through its level and crank connections with the sliding table 2, hastens the coming together of the contact points; the hastening of the meeting of the contact points being in proportion as the speed of the movement of the machine requires the more rapid movement of the range finder, a speed over what would be calculated upon the scales.

In looking at the instrument the contact point 7 may be considered as a moving contact and the point 5 as a normally fixed contact since its movement is effected automatically and only under changing conditions.

The sector *e* as shown is employed as a means of preserving an even movement between the related parts; but any suitable means may be employed as a substitute therefor.

Claims:

1. In a device of the character described a telescope mounted upon trunnions; a toothed adjustable sector secured to one of the trunnions; a spring governor; a sliding base operative by said governor; a sliding bar on the sliding base adjustable on said sliding base; an electrical contact point on the rear end of the sliding bar; a sliding rack bar beneath the sliding base, a rack on said bar, an electrical contact point on the rear end of said bar in alinement with the contact point on the adjustable bar, the rack on said bar engaging with a pinion on the governor shaft; and a rack pivoted to the forward end of said bar to engage with the sector on the telescope.

2. In a device of the character described, a frame; a sliding base in the top of the frame; a rack bar extended longitudinally through the frame contiguous to and parallel with the sliding base; a spring governor within the frame, a pinion on the governor shaft engaging with the rack bar, a disk slidable on the governor shaft operated by the governor springs, a lever pivoted in the frame engaging with the said disk, a bell crank pivoted to the top of the frame, the outer end of the disk lever connected with one arm of the bell crank, a bracket on the sliding base said bracket connected with an arm of the said bell crank; a longitudinally adjustable sliding bar on the sliding base, an electrical contact point on the rear end of the sliding bar, a pointer on the sliding bar and a scale on the sliding base; an electrical contact point on the rear end of the sliding base the two contact points in alinement one with the other; and means at the forward end of the said rack bar for connecting said bar with a sighting device.

3. In a device of the character described, a frame; a sliding base in the top of the frame; a rack bar extended longitudinally through the frame contiguous to the sliding base; a spring governor within the frame, a pinion on the governor shaft engaged with the rack bar, a disk slidable on the governor shaft operated by the governor, a lever pivoted in the frame engaging with said disk, a bell crank pivoted to the top of the frame, the outer end of the disk lever connected with one end of the bell crank, a bracket on the sliding base said bracket connected with an arm of the bell crank; a longitudinally adjustable sliding bar on the sliding base, an electrical contact point on the rear end of the sliding bar; an electrical contact point on the rear end of the sliding base the two contact points in alinement one with the other; a rack pivoted to the forward end of the said rack bar; and a segment secured to a trunnion of a sighting device for engagement with the said connecting bar.

4. In a device of the character described for timing the dropping of missiles, means for connecting the device with a sighting device comprising the actuating bar, a rack bar pivoted to the actuating bar, and a sector secured to a trunnion of the sighting device, gear teeth on the sector to engage with said rack, the sector connection with the trunnion being adjustable in its length, and a pointer and scale on the adjustable parts.

5. The combination in an instrument as described of a sighting device, a sliding bar constituting a means for effecting an electrical contact, and means for operating said bar by the sighting device, and adjustable means on a sliding base adjacent to said bar for a normally fixed contact, means for changing the fixed contact to a quickly moving contact, comprising a governor, means by which the sliding bar actuates the governor, and lever connecting means between the governor and the said sliding base.

WILLIAM WAIT, Jr.

Witnesses:
WILLIAM WAIT,
K. E. ANDERSON.